3,228,656
HYDRAULIC ROTARY MACHINE
Takeji Kyogoku, Kobe, Japan, assignor to Mitsubishi Jukogyo Kabushiki Kaisha, Chiyoda-ku, Tokyo, Japan
Filed Feb. 17, 1965, Ser. No. 433,291
Claims priority, application Japan, Feb. 21, 1964, 39/9,050
7 Claims. (Cl. 253—52)

This invention relates to hydraulic rotary machines. More particularly, this invention relates to hydraulic machines which are convertible for use as liquid turbines and as pumps. The invention contemplates the use of a Francis-type liquid turbine (reaction turbine) as the hydraulic machine which is operable both as a pump and a turbine.

It is known to utilize Francis-type water turbines as pumps as, for example, in pumped storage hydraulic plants. Hydroelectric rotary machines of this kind (such as water turbines, centrifugal pumps, centrifugal blowers, etc.) are well known.

In the conventional types of hydraulic rotary machines, auxiliary vanes are detachably mounted on the outer periphery of a Francis type runner, which vanes are detached from the runner during its operation as a turbine, and are fitted on the runner during operation as a pump, so that in operation, either as a water turbine or as a pump, the machine can be operated with the same rotating runner operating at its highest efficiency.

However, in such conventional machines it has been necessary for the auxiliary vanes to be secured or detached to the runner from the outside of the machine, thereby resulting in a very complicated construction. While theoretically high efficiency may be obtained from such a machine, yet many practical difficulties have been encountered.

For instance, it is necessary in such machines to provide a mechanism for lifting the auxiliary vanes, a mechanism for lowering the vanes, a mechanism for retaining the detached vanes, locating means for the securing of the vanes to the runner, clamping means for securing the vanes to the runner, and means to adjust and establish the correctness of each of the above operations.

It is an object of the invention to eliminate all the above-mentioned defects in a machine adapted for use as a turbine or a pump.

It is a further object of the invention to provide a hydraulic rotary machine which is adapted for use in pumped storage power plants, but which may also be utilized in other types of turbines or pumps having the same rotating speed under varying conditions of heads or lifts, as well as in centrifugal blowers under widely varying pressure conditions and the like.

Another object of the present invention is to provide a hydraulic rotary machine of simple construction and of a low manufacturing cost with high efficiency.

A feature of the present invention is that the auxiliary vanes are not secured and detached from the runner from the outside thereof, but are slidably accommodated inside the runner for being selectively projected into a position of alignment with the vanes of the runner along the outer periphery thereof to constitute extensions of the runner vanes when necessary.

These and other objects and features of the present invention will become apparent from the following description taken in conjunction with the accompanying drawings, in which.

Figure 1:
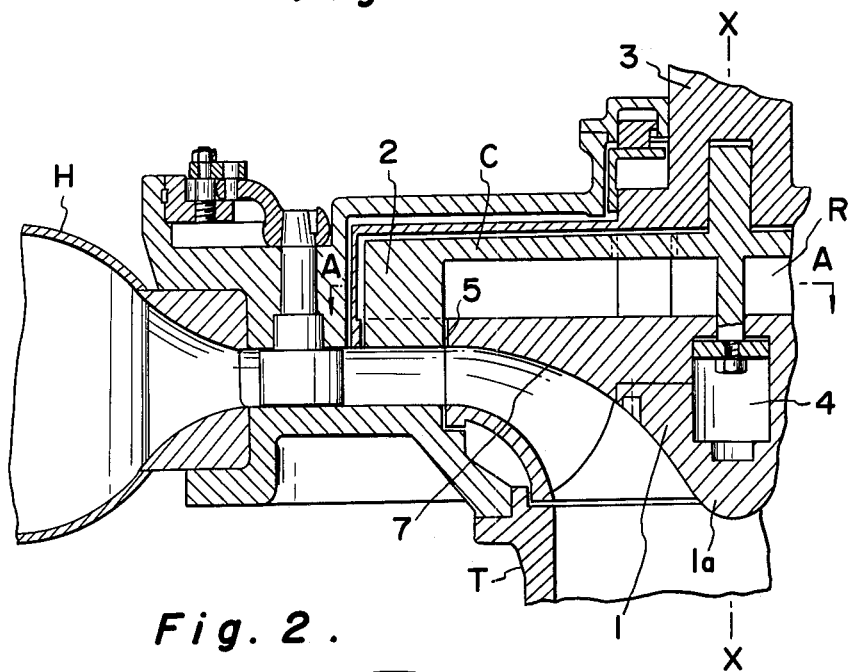
FIGURE 1 is a sectional elevational view of a portion of a hydraulic machine according to the invention.
Figure 2:
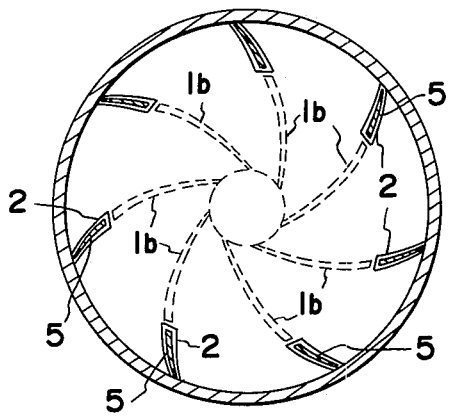
FIGURE 2 is a sectional view taken along line A—A of FIG. 1 showing the entire runner.

The machine shown in FIGS. 1 and 2 is a modified Francis-type water turbine which is also adapted for use as a pump. The machine comprises a runner 1 which is supported for rotation about an axis X—X. When the machine is operative as a turbine, the runner is driven in rotation by the passing fluid, which enters the machine in housing H, passes through the runner 1, and is discharged from the tube T. When the machine is operative as a pump, the runner is externally driven by a motor or the like to deliver fluid at pressure from housing H, said fluid entering the machine through tube T and passing through the runner 1. In operation as a pump, kinetic energy from the driven runner is transferred to the fluid to increase the energy level thereof, whereas in operation as a turbine, energy from the fluid is transferred to the runner to drive the same.

In order for the machine to be efficient, both as a pump and a turbine, the runner requires a different construction for each operation. This will become more evident from the following discussion.

The runner is composed of a central boss 1a and radial vanes 1b extending from the boss 1a. The vanes 1b serve the function of guiding the passage of the fluid through the runner. Within the runner 1 are supported a plurality of auxiliary vanes 2 which are integrally formed on a vane carrier C and are aligned with the vanes 1b for the purpose of selectively lengthening the same, as will be described more fully hereinafter. Connected to the runner, or integrally formed therewith, is a main shaft 3 which, in the case of the machine being employed as a pump, is externally driven, whereas when the machine is employed as a turbine, it is driven in rotation by the fluid passing through the runner. The vane carrier C is supported in a recess R in the runner 1 by means of a servo-motor 4, whereby the vane carrier C can be raised and lowered by the servo-motor 4 in the recess R in the runner 1. When the vane carrier C is in an upper position, the vanes 2 have lower edges which are flush with the surface 7 of the runner 1, whereas when the vane carrier is lowered, the lower edges of the vanes 2 protrude beyond the surface 7 of the runner. Thus, when the vanes 2 are retracted as shown in FIG. 1, the blades of the machine have an effective length equal to the length of blades 1b. However, when the blades 2 protrude to a maximum extent, the blades of the machine have an effective length equal to the length of blades 1b of the runner plus the length of the blades 2. Thereby the blades 2 may constitute an extension of the blades 1b. Thus, considering FIG. 2, the length of the blades of the machine when the blades 2 are retracted, is equal to the length of blades 1b shown in dotted outline, whereas, when blades 2 are extended the length of the blades of the machine is equal to the length of the dotted outline of blades 1b plus the length of blades 2. Thus, the blades 2 may selectively increase the blade length of blade 1b.

When the machine is operative as a pump, the blades 2 are extended into alignment with blades 1b, whereas, when the machine is operative as a turbine, the blades 2 are retracted to a position out of alignment with the blades 1b. The auxiliary vanes 2 have a shape corresponding to a smooth extension of the vanes 1b. Vanes 2 are accommodated in cavities 5 in the runner 1, said cavities having the shape of the vanes 2 in the manner shown in FIG. 2.

By actuating the servo-motor 4 to cause the vanes 2 of the vane carrier to protrude beyond the surface 7, the blades of the runner act as elongated blades, whereas by raising the auxiliary vanes 2 to a position above the outer periphery of the blades of the runner 1, as shown in FIG. 1, the auxiliary vanes 2 will no longer develop hydrodynamic effects.

In the present invention, as above-mentioned, since the auxiliary vanes 2 are accommodated inside the runner 1 and can be retracted or extended at the outer periphery of the blades 1b of the runner 1 when required, the structure is greatly simplified, resulting in a low cost of manufacture. The present invention, furthermore, has advantages in that the operation is reliable and free from error, while even during operation, retraction or extension of the auxiliary vanes 2 can be conducted quickly.

Figure 3:
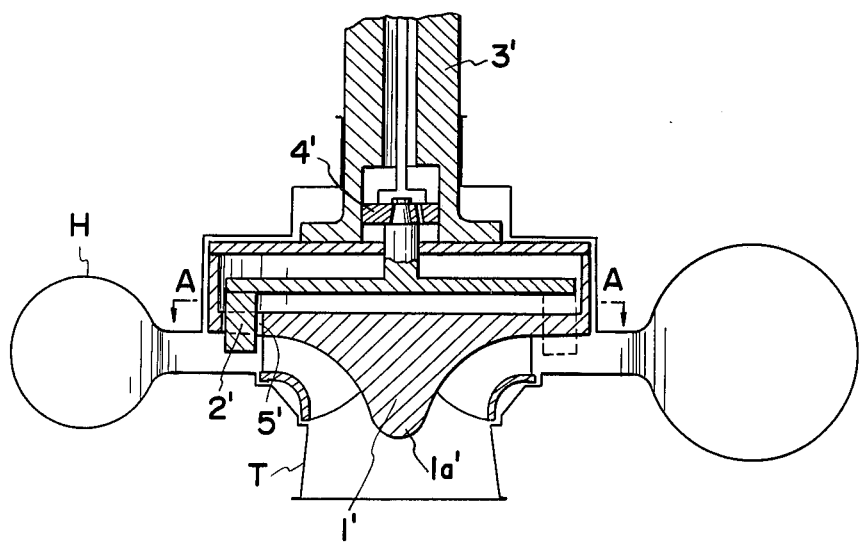
FIGURE 3 is a sectional elevational view of a modification of the machine of FIG. 1.

The modification illustrated in FIG. 3 is similar in general construction to the embodiment as shown in FIG. 1, differing therefrom in that servo-motor 4' is mounted within the main shaft 3' on the upper portion of the runner 1'. By this arrangement, the central boss 1a' of the runner 1' can be simplified.

It is understood that the means for retracting and extending the auxiliary vanes relative to the runner 1 need not always be a servo-motor, and any suitable device may be employed therefor.

It will be obvious to those skilled in the art that the invention is not limited to the illustrated embodiments, and that various changes and modifications may be made without departing from the scope of the invention as defined in the attached claims.

What is claimed is:

1. A hydraulic machine which is convertible between a pump and a turbine, said machine comprising a housing having an inlet and an outlet for a fluid and defining between said inlet and outlet a passageway for the flow of said fluid, a runner body rotatably mounted in the housing in the path of the fluid, a shaft coupled to said runner body for rotating the same when the machine is operative as a pump and for being driven by the runner body when the machine is operative as a turbine, said runner body including a plurality of radial vanes between which the fluid is constrained to pass, said runner body having an internal recess, means including a carrier body and auxiliary vanes displaceably supported in said recess of said runner body for movement between a first retracted position and a second protruding position, the auxiliary vanes in the latter position being aligned with and constituting extensions of said radial vanes, and means engaging the carrier body to move the same when the machine is operative as a turbine to said retracted position and to move the body when the machine is operative as a pump to said protruding position, said fluid and vanes respectively operating on one another to convert fluid pressure to rotation of the runner body when the machine is operative as a turbine whereas upon operation as a pump, the rotation of the runner body is converted to pressure of the fluid.

2. A machine as claimed in claim 1 wherein said inlet is disposed at the level of the runner body at a location radially outwards of the periphery of the body, said outlet being disposed in a central region of the runner body.

3. A machine as claimed in claim 2 wherein said runner body includes a central depending boss extending into said outlet, said blades being mounted on said boss and extending from the inlet to the outlet.

4. In a machine as claimed in claim 2 wherein said runner body includes a central boss having an opening, said carrier body including a portion extending into said opening; said means for moving the carrier body being disposed in said opening in engagement with said portion for displacing the carrier body such that the auxiliary vanes are moved between said first and second positions.

5. In a machine as claimed in claim 4 wherein said means in said opening is a servo-motor.

6. In a machine as claimed in claim 2 wherein said drive shaft has an opening, said carrier body including a portion extending into said opening; said means for moving the carrier body being disposed in said opening in engagement with said portion for displacing the carrier body such that the auxiliary vanes are moved between said first and second positions.

7. In a machine as claimed in claim 6 wherein said means in said opening is a servo-motor.

References Cited by the Examiner

UNITED STATES PATENTS 1,627,294    5/1927    Nydquist _____ 103—97

FOREIGN PATENTS 883,378    7/1953    Germany.

SAMUEL LEVINE, *Primary Examiner.*

HENRY F. RADUAZO, *Assistant Examiner.*